United States Patent Office 3,437,464
Patented Apr. 8, 1969

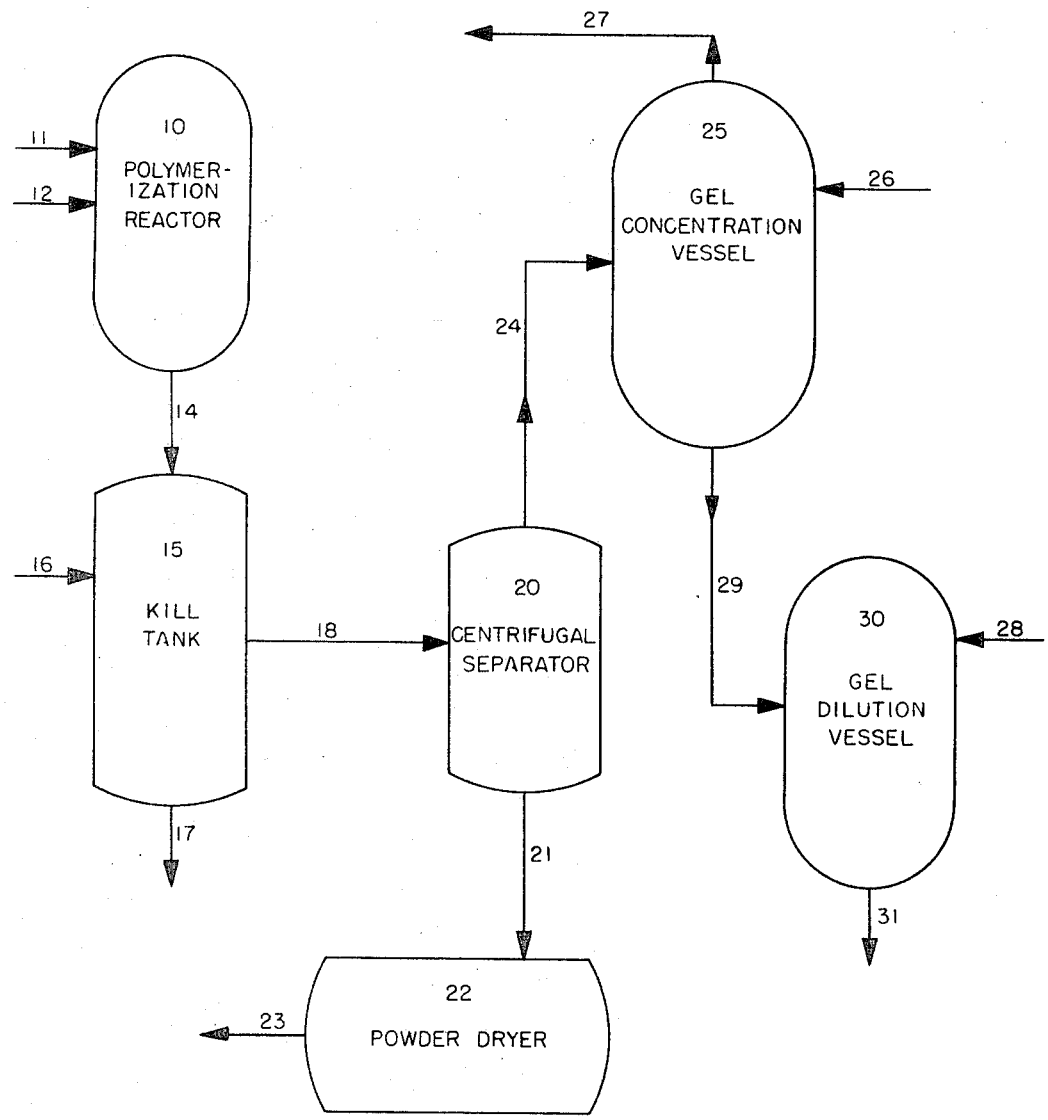

3,437,464
GELLING NORMALLY LIQUID VOLATILE HYDROCARBONS WITH ATACTIC PROPYLENE-ETHYLENE COPOLYMERS
Richard P. Maloney, Chester, Pa., assignor to Sun Oil Company, Philadelphia, Pa., a corporation of New Jersey
Continuation-in-part of application Ser. No. 590,974, Oct. 31, 1966. This application Mar. 5, 1968, Ser. No. 729,850
Int. Cl. C10l 7/02
U.S. Cl. 44—7                6 Claims

ABSTRACT OF THE DISCLOSURE

This disclosure describes gelled normally liquid volatile hydrocarbon fuel compositions and processes for obtaining them. These compositions contain 5 to 45 weight percent atactic propylene-ethylene copolymer, said copolymer containing 1 to 30 weight percent copolymerized ethylene in the polymer chain, and said copolymers being in the form of random or terminal block structure. The gelled hydrocarbon compositions disclosed herein are particularly suited for use in military applications such as fuels in firebombs and flamethrowers.

CROSS REFERENCE TO RELATED APPLICATION

This application is a continuation-in-part of my copending application Ser. No. 590,974, filed Oct. 31, 1966, now abandoned.

BRIEF SUMMARY OF THE INVENTION

This invention relates to novel gelled fuel compositions of a particularly tacky nature and to the preparation of such compositions. More particularly this invention relates to gelled fuel compositions containing atactic propylene-ethylene copolymers as gelling agents for normally liquid volatile combustible hydrocarbons. Specifically, this invention relates to tacky viscous gelled fuel compositions particularly suitable as a fuel in firebombs, flamethrowers, and related areas of military applications.

BACKGROUND OF THE INVENTION

Considerable art has been developed heretofore with respect to the manufacture of gelled or thickened fuels, particularly designed for use in firebombs, flamethrowers, and related military applications. Thickening agents such as natural or synthetic rubber, metallic fatty acid soaps, and various synthetic organic and inorganic polymers have been proposed as gelling agents for gasoline or similar normally liquid volatile hydrocarbon fuels. For example, U.S. Patents 2,455,311 and 2,606,107 propose polyisobutylene as a gelling agent. U.S. Patent 3,084,033 discloses that crystalline polypropylene is suitable for gelling liquid hydrocarbons although amorphous polypropylene is said to be unsuitable for that purpose. Recently it has been disclosed that napalm "B" which consists of 25 percent gasoline, 25 percent benzene, and 50 percent polystyrene, is presently being used as a fuel for firebombs and flamethrowers. While many of the prior art thickening agents have provided usable gelled fuel compositions, certain inherent deficiencies in each of these compositions render these compositions only fair at best.

Foremost among these disadvantages is the relatively large proportion of thickener required to provide a suitable thickened fuel, e.g., napalm "B," requires 50% polymer. Also the sensitivity of many of the known thickening agents to moisture and/or pH factors and the lack of stickness or tack normally required to maintain the gelled fuel on the objective after it has been applied thereto are characteristics which are undesirable for fuels used in firebombs and flamethrowers. These and other disadvantages of current technology have resulted in a continuing search for new and improved thickening agents and manufacturing methods to produce gelled volatile liquid hydrocarbon fuel compositions particularly suitable for firebomb, flamethrower, and related military applications.

It is a principle object of this invention to provide a novel process for thickening normally liquid volatile hydrocarbons, employing novel thickening agents, whereby thickened fuel compositions having improved properties are obtained. Another object of this invention is to provide a process utilizing novel thickening agents for making gelled volatile liquid hydrocarbon compositions which have the combined properties of being insensitive to moisture and of having improved tack properties, and which require less thickening agent than other gelled fuel compositions heretofore disclosed. A more specific object of this invention is to provide new and improved gelled fuel compositions containing atactic propylene-ethylene copolymers as the thickening or gelling agents. These and other objects and benefits will become more readily apparent from a reading of the following detailed description of the invention.

DESCRIPTION OF THE INVENTION

Atactic polypropylene is a tacky amorphous polymer fraction which is a by-product of the stereospecific polymerization procedures widely used to recover the valuable crystalline propylene polymer. Wide usage of this polymeric by-product has not as yet evolved and often it is discarded. Previous attempts to use atactic polypropylene as a gelling agent for volatile normally liquid hydrocarbons have been unsuccessful. However, it has now been discovered that atactic polypropylene-ethylene copolymers containing 1 to 30 weight percent polymerized ethylene in the propylene polymer chain have the desirable tack properties of atactic polypropylene along with the required gel forming characteristics necessary to gel normally liquid volatile hydrocarbons. It has been discovered that this new polymer has all the necessary requirements for use as a gelling agent for normally liquid volatile hydrocarbons to form gelled compositions for use as fuels in firebomb, flamethrower, and other military incendiary armament. It has now been discovered that normally liquid hydrocarbons and mixtures thereof can be thickened to form a viscous tacky gelled fuel composition particularly suitable for firebomb and flamethrower fuel applications by admixture of the normally liquid hydrocarbons with a minor proportion (5 to 45 weight percent) of an atactic propylene-ethylene copolymer. It has been discovered further that atactic propylene-ethylene copolymers inherently will absorb larger volumes of liquid hydrocarbons (than other polymers do) while maintaining gel characteristics. Thus a relatively small amount of atactic propylene-ethylene copolymer is needed to provide a suitable thickened normally-liquid hydrocarbon firebomb fuel composition. It has also been discovered that a gelled fuel composition prepared with an atactic propylene-ethylene copolymer has the further advantages of being highly tacky or sticky and also unaffected by moisture. These two particular advantages of atactic polypropylene-ethylene copolymer gelled fuel compositions along with the added characteristics of high stability and quick ignition over a board temperature range, render these compositions particularly suitable and desirable for use in firebomb or flamethrower applications.

By the term atactic propylene-ethylene copolymer as disclosed herein is meant the solid substantially amorphous fraction of polymer recovered from the stereospecific polymerization of propylene and ethylene wherein the major amount of polymerized monomer in the product is propylene. This substantially amorphous polymer fraction is generally known in the art as the atactic propylene-ethylene copolymer fraction and is normally recovered as a by-product from the low pressure stereospecific polymerization process used in making crystalline propylene-ethylene copolymers. These stereo-specific polymerization procedures are well known to those skilled in the art. Examples of this type of process are disclosed in Belgian Patent 538,782 and British Patent 994,416, as well as many others. Atactic propylene-ethylene copolymers are generally characterized as solid amorphous polymers having a molecular weight in the range of 20,000–300,000, as measured by intrinsic viscosity in decalin at 275° F., and a density in the range of 0.82 to 0.91.

The structure of the random copolymer is conceived to be of the general formula

—PPPEPPPPEEPPPPEPPPPP wherein P is a polymerized proplyene monomer and E is a polymerized ethylene monomer. The typical atactic random propylene-ethylene copolymer can contain 1 to 20 weight percent polymerized ethylene and have an average molecular weight in the range of 20,000 to 150,000.

The structure of the terminal block propylene-ethylene copolymer is believed to be similar to the formula

—PPPPPPPPEEEPPPPEEEEEE

Again P represents a polymerized propylene monomer and E represents a polymerized ethylene monomer. The typical atactic terminal block propylene-ethylene copolymer can contain 5 to 30 weight percent polymerized ethylene in the proplyene polymer molecule as measured by infrared analysis, and have an average molecular weight in the range of 50,000 to 300,000. The atactic fraction of propylene-ethylene copolymers can also contain small quantities (<5%) of polyethylene as an impurity.

In the process the polymers are prepared by polymerizing the constituent monomers in the desired proportions with the aid of certain polymerization catalysts, e.g., see above-mentioned Belgian patent. The catalysts are solid, insoluble, reaction products obtained by partially reducing a reducible, heavy transition halide of a Group IV$b$ or VI$b$ or VIII metal with a reducing Group I and III metal-containing material such as organometallic compound of an alkali, alkaline earth, rare earth metal or zinc. They can also be advantageously prepared by reducing an appropriate metal compound with the aid of metallic aluminum or a mixture of aluminum and titanium, etc. A catalyst of this type can thus be prepared, for example, by reducing 1 mole of titanium tetrahalide, usually tetrachloride, to the corresponding trivalent or subtrivalent titanium halide with about 0.2 to 6 moles of aluminum triethyl, triisobutyl or other aluminum alkyl compound of the formula RR′AlX. In this formula, R, R′, and X can comprise alkyl groups and which can alternatively by hydrogen or a halogen, notably chlorine. The reducing is carried out by dissolving each of the two catalyst components in an inert solvent, preferably a $C_3$ to $C_{18}$ paraffin such as isopentane, n-hexane, or n-heptane, and mixing the two solutions in the proper proportions at temperature between 0° and 300° F. and in the absence of moisture, oxygen, and sulfur impurities. The resulting precipitate in conjunction with some free aluminum alkyl compound is generally considered to constitute the actual active polymerization catalyst. Other organic and metallo-organic coordinators such as tetra ethoxysilane or the dimethyl ethers of polyethylene glycol can also be added to form the coordinated complex catalysts usable for alpha-olefin polymerizations. Alternatively, it is possible to carry out the catalyst preparation using only about 0.3 to 0.8 mole of the aluminum alkyl compound per mole of titanium chloride, and then add a supplemental amount of the aluminum alkyl compound to the polymerization zone to raise the Al/Ti mole ratio therein to a value between about 1:1 and 3:1. The monomers are then contacted with the resulting catalyst in the presence of inert hydrocarbon solvents.

The polymerization is conveniently effected at temperatures of about 100°–250° F., and pressures ranging from about 0–500 p.s.i.g., usually 0–100 p.s.i.g. The catalyst concentration in the polymerization zone is perferably in the range of about 0.01 to 0.5 wt. percent based on total liquid and the polymer product concentration in the polymerization zone is preferably kept between about 5 to 15 wt. percent based on total contents so as to allow easy handling of the polymerized mixture. The atactic polymer fraction is normally present in the concentration range of 0.5 to 4.0 wt. percent based on the total contents of the slurry. The proper polymer concentration can be obtained by having enough of the inert diluent present or by controlling the polymerization short of 100% conversion.

When the desired degree of polymerization has been reached, a $C_1$ to $C_3$ alkanol such as methyl alcohol, ethanol, or isopropyl alcohol is normally added to the reaction mixture for the purpose of deactivating and partially dissolving the catalyst. However, other methods of catalyst deactivation well known to those skilled in the art can alternatively be used.

Typical polymerization products obtained from the above-disclosed methods are normally mixtures of polymers with varying molecular structures and varying molecular weights which can be fractionated by solvents, the solvent-separated fractions being polymers of differnt structures and different molecular weights. In the polymerization process using an inert hydrocarbon polymerization medium such as isopentane, hexane, or heptane, the product obtained will be generally in a slurry form and is normally partially soluble in the polymerization medium.

Generally the insoluble polymer product is recovered from the solvent containing the dissolved polymer fractions by centrifuging the slurry or by filtration or both. The recovered solid polymer product is often subsequently washed with alcohol and dried to yield a white powdery high molecular weight, highly crystalline polymer product. This polymer fraction is normally referred to as the crystalline fraction.

The remaining solvent-soluble propylene-ethylene copolymer fraction, which is conventionally referred to as the atactic fraction, is composed of primarily amorphous propylene-ethylene copolymer which is defined as polymer of a non-stereoregular structure. A small amount (1–20%) of stereoblock polymer is also usually present as an impurity. This polymer is non-crystallizable stereoblock polymer which has been described as a generally linear alphaolefin polymer having crystallizable segments of stereoregular structure and non-crystallizable segments of irregular structure in the same molecule. Often crystalline polymers are also present as impurities in small quantities (1–20%) in atactic propylene-ethylene copolymers. The atactic copolymer fraction can be recovered from the polymerization solvent by simple distillation or steam stripping.

Typical atactic propylene-ethylene copolymers are physically characterized as having a density in the range of 0.82–0.91 grams/cc.; a ring and ball softening point (ASTM D28–58T) in the range of 200–350° F., and a number average molecular weight in the range of 20,000–300,000 (intrinsic viscosity in decalin at 275° F.). Typical atactic propylene-ethylene random copolymers normally have a molecular weight in the range of 20,000–150,000. Typical atactic propylene-ethylene block copolymers have a number average molecular weight in the range of 50,000–300,000.

The liquid hydrocarbons which can be thickened in accordance with the invention include pure hydrocarbons of any structural configuration, and mixtures of any and all such types, boiling within the range of from about 80° F. to about 650° F. at atmospheric pressure. Straight- or branched-chain paraffins and olefins, cycloparaffins and aromatic hydrocarbons can thus be thickened in accordance with this invention. Non-limiting examples of such hydrocarbons are pentane, hexane, octane, decane, isopentane, isooctane, triptane, pentene-1, 2-methylbutene-1, hexene-1, heptene-1, octene-1, cyclopentane, cyclohexane, benzene, toluene, xylene, and the like. Various fractions of naturally-existing mixture of hydrocarbons, such as certain fractions of petroleum, can also be satisfactorily thickened in accordance with the invention. Petroleum fractions boiling within the above-stated permissible atmospheric boiling range, including gasoline, kerosine, petroleum spirits, and No. 2 furnace oil are particularly suitable for use in making a gelled volatile liquid hydrocarbon fuel concentrate. Gasoline fractions generally comprise mixtures of hydrocarbons boiling within the range of from about 80° F. to about 440° F., at atmospheric pressure. Petroleum spirits boil in the range of 300–400° F. and kerosine has an atmospheric boiling range of from about 350° F. to about 550° F. No. 2 furnace oil normally boils in the range of 400–650° F. at atmospheric pressure. Mixtures of such petroleum fractions in any and all proportions can also be suitably thickened in accordance with this invention. However, it is preferred that mixtures of petroleum fractions which comprise a No. 2 furnace oil fraction or other high boiling fractions should contain at least 80 weight percent gasoline to provide the volatility characteristics required in most applications for thickened hydrocarbon fuels.

Briefly stated one process of the present invention comprises blending together equal quantities of atactic propylene-ethylene copolymer and a liquid hydrocarbon fuel and heating and agitating the blend for a short period of time until a homogeneous composition of thickened hydrocarbon fuel results. This composition is referred to as the gelled fuel concentrate which can then be further diluted with low temperature boiling range hydrocarbon fuel to the desired thickness or consistency. Atactic propylene-ethylene copolymers are substantially soluble in all liquid hydrocarbons, so that higher boiling hydrocarbon mixtures such as No. 2 furnace oil or spirits can be used to form the gelled fuel concentrates. The advantage of this solubility characteristic of propylene-ethylene copolymers lies in the fact that with higher boiling hydrocarbons in the initial gel concentrate, higher temperatures can be used during the first step of gelling the polymer and liquid fuel. Thus this phase of the process can be achieved in a relatively short period of time. This advantage is particularly attractive in a continuous process of forming gelled fuel compositions.

An illustration of one specific process embodiment of the present invention is as follows: Referring to the drawing a propylene-ethylene copolymer is synthesized in a continuous process by feeding into a steam jacketed polymerization reactor vessel 10 having a means for stirring disposed therein, and maintained at polymerization conditions disclosed above, a mixture of propylene and ethylene by way of line 11. A slurry of a coordinated complex catalyst as disclosed above in a low boiling hydrocarbon solvent such as hexane or heptane is introduced through line 12 to vessel 10 wherein the alphaolefins are polymerized to produce a mixture of atactic and crystalline propylene-ethylene copolymers in a hydrocarbon solvent slurry. The polymer-solvent slurry is continuously transferred to kill tank 15 from vessel 10 by way of line 14. A mixture of water and alcohol is continuously added via line 16 to kill tank 15 wherein the catalyst in the polymer slurry is deactivated and there is formed therein a two-phase liquid system comprised of water and alcohol containing extracted polymerization catalysts in the lower phase and the solvent polymer slurry in the upper phase. The lower phase is continuously removed from kill tank 15 through line 17 and discarded; the upper phase is continuously transferred to centrifuge 20 by way of line 18. The solid insoluble substantially crystalline polymer is therein separated from the solvent containing dissolved atactic polymer, and transferred to dryer 22 through line 21. The polymerization solvent containing the dissolved atactice polymer is transferred continuously to gel concentrate vessel 25 by way of line 24. Liquid hydrocarbon fuel having a minimum boiling point of at least 10° F. higher than the boiling point of the polymerization solvent is added at the desired rate to the solvent atactic polymer solution in vessel 25. Vessel 25 is maintained at a temperature above the boiling point of the polymerization solvent and below the boiling point of the hydrocarbon fuel so as to provide for removal of the polymerization solvent by distillation thereby forming continuously a polymer-hydrocarbon fuel gel concentrate. The distilled polymerization solvent recovered from vessel 25 can be recycled to polymerization reactor 10 by way of line 27. Line 27 can contain a solvent purification means which is not shown.

The polymer-liquid hydrocarbon fuel concentrate recovered as a residuum from vessel 25 is continuously transferred by way of line 29 to gel dilution vessel 30 wherein the gelled fuel concentrate can be further diluted with added hydrocarbon fuel introduced through line 28.

The finished gelled liquid hydrocarbon fuel is continuously recovered from vessel 30 through line 31. The liquid hydrocarbon fuel introduced in vessel 25 by way of line 26 is preferably a higher boiling fuel boiling above 200° F. so as to permit maintaining a temperature in the vessel which proivdes for rapid removal of the low boiling polymerization solvent. It is sometimes desirable to concentrate the atactic polymer with the polymerization solvent in vessel 25 and omit adding any other hydrocarbon fuels at that phase of the process. This method is easily accomplished by closing off line 26. Also the gelled fuel concentrate can pass directly through vessel 30 without further addition of hydrocarbon fuel and be recovered in the concentrate form which can be diluted at a later time. The process can be continuous as disclosed or conducted as a batch process.

In the procedure where terminal block propylene-ethylene copolymers are desired, 100% propylene monomer is fed to the reaction vessel in the first polymerization phase. After the desired amount of propylene has been polymerized, either 100% ethylene or a mixture of propylene and ethylene are fed to the reaction zone to bring about the second and final polymerization phase. The atactic fraction of propylene-ethylene copolymers normally contain between 1 and 30 weight percent polymerized ethylene in the polymer chain as measured by infrared procedures.

In the drawing autoclave 10 can comprise a single vessel or two communicating vessels in series wherein polymerization can be accomplished in both vessels concurrently or in sequence. The atactic polymer-polymerization solvent solution will normally contain 0.5 to 4.0 weight percent polymer in solution.

As an illustration of a few specific embodiments of compositions included in the present invention, the following examples are herein presented. In the examples all parts and percents are by weight and boiling temperatures are at atmospheric pressure except where otherwise stated.

Example I 100 grams of atactic random propylene-ethylene copolymer recovered from the polymerization of a continuous feed of a mix of 95 percent propylene and 5 percent ethylene and having typical atactic random copolymer properties were blended with 100 grams of a narrow cut petroleum fraction characterized as boiling in the range of 300–400° F. and composed approximately of 50 percent paraffins, 30 percent naphthenes, and 20 percent aromatics. The blend was heated to 150° F. for 15 minutes while being stirred. A highly viscous thickened hydrocarbon gelled fuel concentrate resulted. To this gelled fuel concentrate was subsequently added 300 grams of gasoline. The final blend comprised a highly viscous thickened hydrocarbon fuel composition readily ignitable and gel stable at any temperature in the range of −40 to +125° F. The composition was tacky to the touch, adhered to a surface upon impact and left negligible residue upon burning.

Example II 50 grams of a typical terminal block atactic propylene-ethylene copolymer recovered from the stereospecific copolymerization of propylene and a propylene-ethylene mix in that order and containing 15 percent polymerized ethylene and synthesized by techniques as disclosed above, were blended in the manner described in Example I with 100 grams of petroleum hydrocarbon fraction substantially identical to that disclosed in Example I to form a highly viscous thickened hydrocarbon fuel concentrate. This concentrate was subsequently blended with 200 grams of gasoline to produce a thickened hydrocarbon fuel composition equivalent in properties to the compositions of Example I and yet containing significantly less polymer in the composition.

All of the compositions disclosed provide the efficient gelling characteristics, improved tack characteristics and necessary thickening properties and burning characteristics particularly required for military firebomb and flamethrower applications.

The invention claimed is:

1. A process for the preparation of gelled liquid hydrocarbon fuels which comprises, in a copolymerization process wherein a major amount of propylene and a minor amount of ethylene are copolymerized in a paraffinic hydrocarbon polymerization solvent in the presence of stereospecific polymerization catalyst to form both crystalline and atactic propylene-ethylene copolymer and the atactic copolymer is separately recovered from the reaction mixture as a solution in said polymerization solvent containing 0.5 to 4.0 percent by weight of the atactic copolymer said atactic copolymer containing 1 to 30 weight percent polymerized ethylene, the steps of making a gelled fuel composition which comprises:

(a) admixing said solution with a normally liquid volatile hydrocarbon fuel having an initial boiling point of at least 10° F. above the boiling point of said polymerization solvent;

(b) distilling polymerization solvent from the resulting admixture and recycling same to the copolymerization step; and (c) recovering as residuum said gelled fuel composition.

2. A process according to claim 1 wherein the polymerization solvent is hexane.

3. A process according to claim 1 wherein the polymerization solvent is heptane.

4. A process according to claim 1 wherein the atactic copolymer is random propylene-ethylene copolymer.

5. A process according to claim 1 wherein the atactic copolymer is terminal block propylene-ethylene copolymer.

6. A process according to claim 1 wherein the liquid hydrocarbon fuel has an atmospheric boiling point at a temperature in the range of 80–650° F.

References Cited
UNITED STATES PATENTS

| | | | |
|---|---|---|---|
| 2,917,458 | 12/1959 | Morway et al. | 252—59 X |
| 3,084,033 | 4/1963 | Kelly et al. | 44—7 |
| 3,336,121 | 8/1967 | Jacobson et al. | 44—7 |

DANIEL E. WYMAN, *Primary Examiner.*

CARL F. DEES, *Assistant Examiner.*